US009863516B2

(12) United States Patent
Perez et al.

(10) Patent No.: US 9,863,516 B2
(45) Date of Patent: Jan. 9, 2018

(54) CORN HEAD ROW UNIT GEARBOX LUBRICATION

(71) Applicant: Deere & Company, Moline, IL (US)

(72) Inventors: Javier J. Perez, Madrid (ES); Nathaniel R. Bernklau, Davenport, IA (US); Duane M. Bomleny, Geneseo, IL (US); Sara Cabezas, Madrid (ES); Michael L. Vandeven, Princeton, IA (US); Guillermo G. Sanz, Madrid (ES); Ruben R. Ruperez, Madrid (ES); Prafulla S. Badhe, Maskawad (IN)

(73) Assignee: Deere & Company, Moline, IL (US)

( * ) Notice: Subject to any disclaimer, the term of this patent is extended or adjusted under 35 U.S.C. 154(b) by 158 days.

(21) Appl. No.: 14/874,212

(22) Filed: Oct. 2, 2015

(65) Prior Publication Data

US 2017/0097074 A1 Apr. 6, 2017

(51) Int. Cl.
*A01D 45/02* (2006.01)
*F16H 37/06* (2006.01)
(Continued)

(52) U.S. Cl.
CPC ........... *F16H 37/065* (2013.01); *A01D 69/06* (2013.01); *F16H 57/038* (2013.01);
(Continued)

(58) Field of Classification Search
CPC ............. F16H 57/0423; F16H 57/0409; F16H 57/043; F16H 57/0456; F16H 57/0493;
(Continued)

(56) References Cited

U.S. PATENT DOCUMENTS 2,633,208 A  3/1953 Randt
3,075,690 A  1/1963 Luenberger
(Continued)

FOREIGN PATENT DOCUMENTS

CN  104165219 A  * 11/2014  ............ A01D 47/00
CN  102003531 B  8/2015
(Continued)

OTHER PUBLICATIONS

Extended EP Search Report Application No. 16184446.9, dated Jul. 31, 2017, 7 pages.
(Continued)

*Primary Examiner* — Arpad Fabian-Kovacs
(74) *Attorney, Agent, or Firm* — Joseph R. Kelly; Kelly, Holt & Christenson P.L.L.C.

(57) ABSTRACT

A corn head row unit gearbox includes an input shaft, that rotates about a first axis of rotation and that drives a set of bevel gears. The bevel gears transfer rotation of the input shaft into rotation of a set of gathering chain output shafts about a second axis of rotation, generally transverse to the first axis of rotation. The gathering chain drive shafts each rotate within a bushing mounted within a frame structure of the gearbox. The frame structure defines a bore that communicates with a bevel gear cavity, in which at least one of the sets of bevel gears rotates, and an interior of the bushings mounted on the gathering chain drive shafts. Rotation of the bevel gears carries lubricant to an inlet aperture on the bore and drives the lubricant through the bore into the bushings.

17 Claims, 5 Drawing Sheets

(51) Int. Cl.
    *A01D 69/06*     (2006.01)
    *F16H 57/038*     (2012.01)
    *F16H 57/04*     (2010.01)
    *A01D 101/00*     (2006.01)
    *F16H 57/00*     (2012.01)

(52) U.S. Cl.
    CPC ..... *F16H 57/0423* (2013.01); *F16H 57/0495* (2013.01); *A01D 2101/00* (2013.01); *F16H 2057/0093* (2013.01)

(58) Field of Classification Search
    CPC . F16H 57/0408; F16H 57/0457; A01D 69/03; A01D 69/06
    USPC .......................................................... 74/605
    See application file for complete search history.

(56) References Cited

U.S. PATENT DOCUMENTS

| | | | | |
|---|---|---|---|---|
| 3,271,940 | A * | 9/1966 | Ashton | A01D 41/141 56/105 |
| 3,341,265 | A | 9/1967 | Paterson | |
| 3,461,656 | A * | 8/1969 | Van Ausdall | A01D 34/43 56/17.1 |
| 3,589,110 | A * | 6/1971 | Schreiner | A01D 41/142 56/106 |
| 3,605,946 | A | 9/1971 | Oehl | |
| 3,759,021 | A * | 9/1973 | Schreiner | A01D 69/06 56/106 |
| 3,831,356 | A * | 8/1974 | Maiste | A01D 45/021 56/10.3 |
| 3,858,384 | A * | 1/1975 | Maiste | A01D 45/025 56/104 |
| 3,913,924 | A | 10/1975 | Barefoot | |
| 4,252,329 | A | 2/1981 | Messenger | |
| 4,434,606 | A | 3/1984 | Rhodes | |
| 4,791,778 | A * | 12/1988 | Wilson | A01D 45/025 56/106 |
| 5,232,291 | A | 8/1993 | Kuan | |
| 6,098,740 | A * | 8/2000 | Abend | A01D 34/6806 180/305 |
| 7,874,134 | B1 | 1/2011 | Hoffman | |
| 8,356,695 | B2 | 1/2013 | Scuffham et al. | |
| 9,386,747 | B2 * | 7/2016 | Madheswaran | A01D 91/04 |
| 2007/0193408 | A1 * | 8/2007 | Martinez | A01D 69/06 74/609 |
| 2009/0191992 | A1 * | 7/2009 | Osborne | A01D 34/6806 474/12 |
| 2015/0319927 | A1 * | 11/2015 | Madheswaran | A01D 57/22 56/105 |
| 2017/0094907 | A1 * | 4/2017 | Bernklau | A01D 69/06 |

FOREIGN PATENT DOCUMENTS

| | | | |
|---|---|---|---|
| DE | 19930804 A1 | 1/2001 | |
| EP | 0908650 A1 | 4/1999 | |
| EP | 1266148 B1 | 2/2006 | |
| EP | 2570017 A1 * | 3/2013 | ........... A01D 34/135 |
| JP | 2010133504 A * | 6/2010 | ......... F16H 57/0493 |
| WO | 0113014 A1 | 2/2001 | |
| WO | WO 2011114769 A1 * | 9/2011 | ............. A01D 69/03 |

OTHER PUBLICATIONS

U.S. Appl. No. 14/874,227 Office Action dated May 15, 2017, 31 pages.
Extended EP Search Report Application No. 16184444.4, dated Jan. 31, 2007, 7 pages.

* cited by examiner

CORN HEAD ROW UNIT GEARBOX LUBRICATION

FIELD OF THE DESCRIPTION

The present description relates to a row-crop harvester. More specifically, the present description relates to a row unit gearbox for a corn head that can be used on a row-crop harvester.

BACKGROUND

There are a variety of different types of harvesting machines that can be used to harvest row crops, such as corn. Such machines often have a header (or head) that is used to engage the crop to be harvested.

A corn head, for instance, may have a plurality of different row units that are arranged next to one another, and that are spaced apart from one another by a distance that roughly corresponds to a row spacing between adjacent rows of the corn to be harvested. The row units can include crop dividers that separate the stalks of adjacent rows from one another, as the harvester moves in a forward direction of travel. The row units are often provided with gathering chains that have lugs projecting out from the gathering chains. Two adjacent gathering chains rotate in cooperation with one another in order to engage the stalks of the plant being harvested and move them toward the harvester. The gathering chains are normally driven by a set of gathering chain drive shafts.

The row units also often have forwardly extending snapping rollers that are mounted to a pair of snapping roller drive shafts. The snapping rollers are configured to draw the corn stalks downward, causing the ears of corn, which are too large to pass between the two snapping rollers, to become detached from the stalks and to move into the harvester.

Power is provided to both the gathering chain drive shafts and the snapping roller drive shafts (i.e., the output shafts) through a row unit gearbox. An input drive shaft drives a set of spur gears that interact with corresponding bevel gears on the gathering chain drive shafts, and the snapping roller drive shafts, to drive both sets of output shafts. The gearbox includes a fluid lubricant that is used to lubricate the various gears and bushings in the gearbox.

The discussion above is merely provided for general background information and is not intended to be used as an aid in determining the scope of the claimed subject matter.

SUMMARY

A corn head row unit gearbox includes an input shaft, that rotates about a first axis of rotation and that drives a set of bevel gears. The bevel gears transfer rotation of the input shaft into rotation of a gathering chain output shaft about a second axis of rotation, generally transverse to the first axis of rotation. The gathering chain drive shaft rotates within a bushing mounted within a frame structure of the gearbox. The frame structure defines a bore that communicates with a bevel gear cavity, in which at least one of the sets of bevel gears rotates, and an interior of the bushing mounted on the frame structure. Rotation of the bevel gears carries lubricant to an inlet aperture on the bore and drives the lubricant through the bore into the bushing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
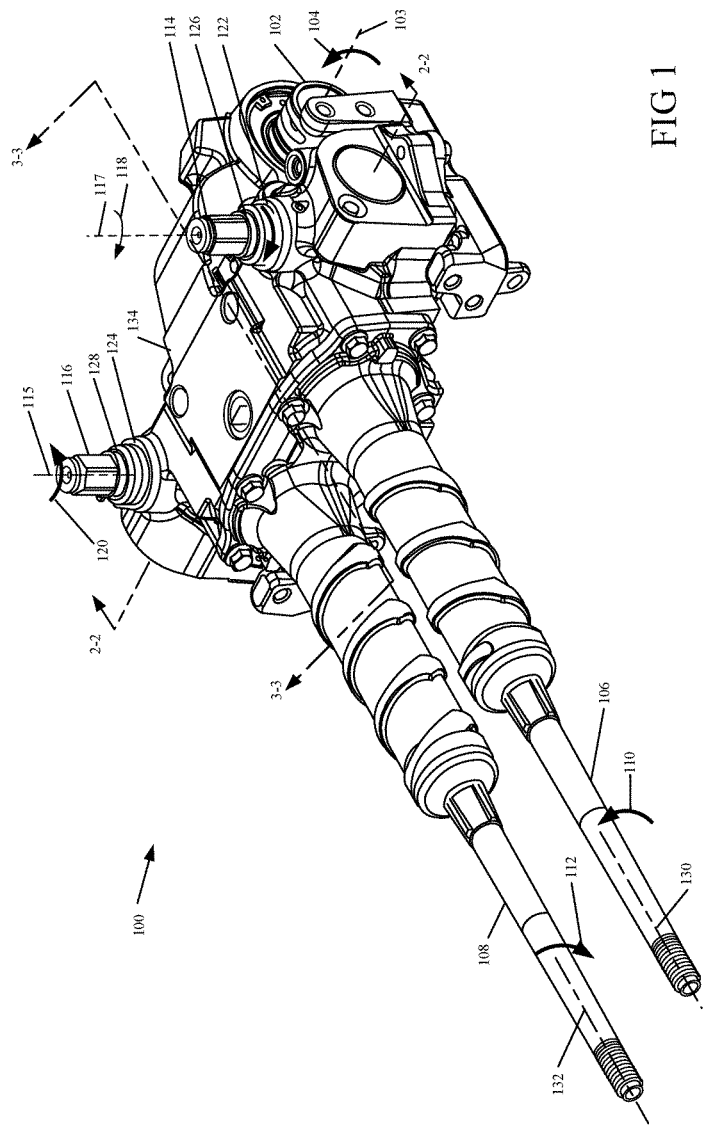
FIG. 1 is an isometric view of one example of a corn head row unit gearbox.

FIG. 1 is an isometric view of one example of a corn head row unit gearbox 100. Gearbox 100 illustratively includes an input shaft shown generally at 102. Input shaft 102 illustratively rotates about an axis of rotation 103 in the direction indicated by arrow 104. It drives a series of bevel gears, or spur gears, which drive rotation of two sets of output shafts. The first set of output shafts includes drive shafts 106 and 108 that drive rotation of stalk snapping rollers. Shafts 106 and 108 illustratively rotate about axes of rotation 130 and 132, in the directions indicated by arrows 110 and 112, respectively, when drive shaft 102 rotates in the direction indicated by arrow 104. The second set of output shafts that are driven by the input shaft 102 includes gathering chain drive shafts 114 and 116. They illustratively rotate about axes of rotation 115 and 117, in the directions indicated by arrows 118 and 120, respectively, to drive a set of gathering chains on the row unit.

Drive shafts 114 and 116 are mounted to gearbox 100 for rotation within a set of bushings shown generally at 122 and 124. The bushings can define an inner surface that is generally coaxial with drive shafts 114 and 116. Bushings 122 and 124 can be sealed with seals 126 and 128. Seals 126 and 128 generally inhibit the migration of the lubricant out of bushings 122 and 124, respectively, and also illustratively inhibit the introduction of foreign matter into the bushings.

In one example, during operation, the orientation of the header can be moved so that the orientation of gearbox 100 varies. By way of example, during a harvesting operation, it may be that the orientation of the header is such that the longitudinal axes 130 and 132, of the stalk snapping roller drive shafts 106 and 108, are nearly parallel to the ground. However, when being stored, the corn head may be oriented such that the longitudinal axes 130 and 132 are oriented more vertically, such that the ends of shafts 106 and 108 furthest from the corn head are pointed more downwardly. This is sometimes referred to as the storage position of the corn head. During shipping, the distal end of the snapping rollers that are driven by drive shafts 106 and 108 are pointed generally vertically upward. This is often referred to as the shipping position.

FIG. 1 also shows that gearbox 100 includes a structural frame portion shown generally at 134. Structural housing portion (or structural housing) 134 illustratively defines a gear train containment area that contains the bevel gears (or spur gears) that are used to transmit rotation from the input shaft 102 to the two sets of output shafts 106 and 108, and 114 and 116. The gear train containment area is often provided with lubricant. However, the bushings 122 and 124, within which gathering chain drive shafts 114 and 116 rotate, are generally above the top surface of the lubricant during normal operation. Therefore, it can be difficult to maintain adequate lubricant levels within those bushings. Also, because the bushings 122 and 124 have a longitudinal axis that is generally oriented vertically during operation, it can be difficult to ensure that the bushings are adequately lubricated with lubricant from the gear train containment area, because the lubricant may tend to migrate downwardly, out of the bushings.

Figure 2:
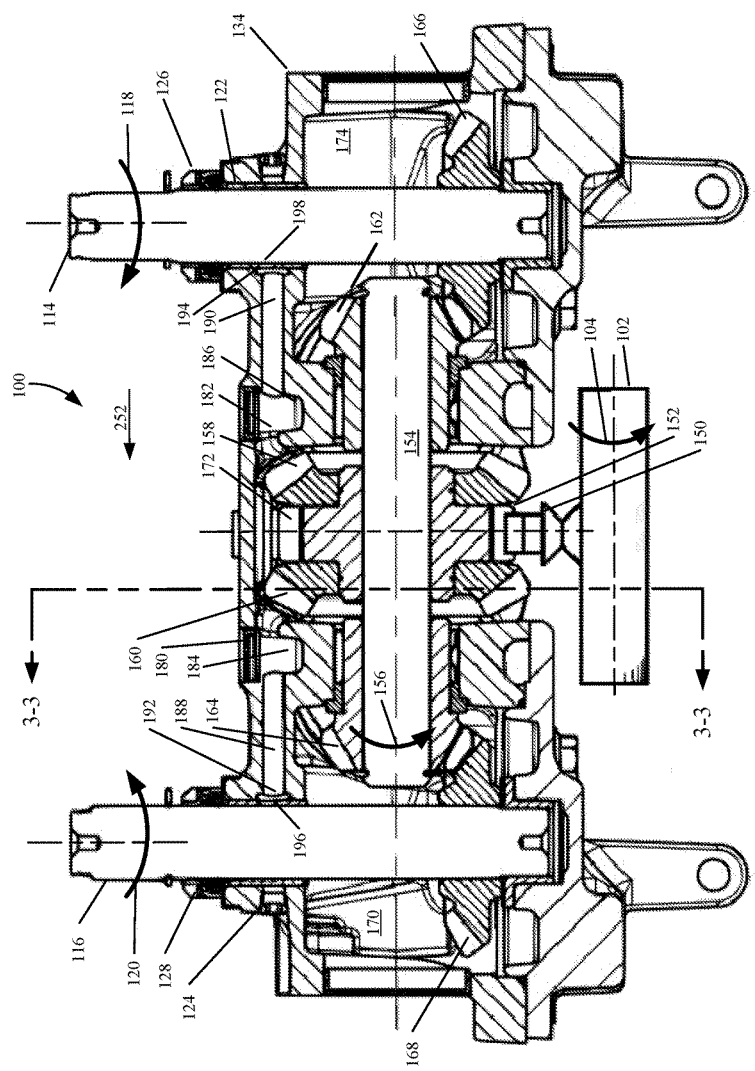
FIG. 2 is a sectional view of the gearbox shown in FIG. 1, taken along section lines 2-2 in FIG. 1.

FIG. 2 is a cross-sectional view of gearbox 100, taken along section lines 2-2 shown in FIG. 1. Similar items to those shown in FIG. 1 are similarly numbered in FIG. 2. In the example shown in FIG. 2, as input shaft 102 rotates in the direction indicated by arrow 104, it illustratively communicates with, and drives, an intermediate set of gears 150 which, itself, drives a mating gear 152 that is attached to bevel gear drive shaft 154. This results in bevel gear drive shaft 154 rotating in the direction indicated by arrow 156. Drive shaft 154 is illustratively coupled to an inner set of bevel gears 158 and 160 and an outer set of bevel gears 162 and 164. Gears 158 and 160 illustratively drive an adjacent set of bevel gears (not shown) which drive rotation of stalk snapping roller drive shafts 108 and 110 in the directions shown in FIG. 1. Gears 162 and 164 illustratively drive rotation of corresponding bevel gears 166 and 168 which are, themselves, attached to gathering chain drive shafts 114 and 116, respectively. This causes shafts 114 and 116 to rotate in the directions indicated by arrows 118 and 120, respectively.

FIG. 2 shows that the structural frame 134 illustratively defines the gear train containment area which is generally comprised of a set of inner cavities 170, 172 and 174. Cavities 170-174 can illustratively be filled, at least partially, with oil or another lubricant. The lubricant serves to lubricate the various bearings, bushings, gears, etc., in gearbox 100. However, as described above with respect to FIG. 1, bushings 122 and 124, within which drive shafts 114 and 116 rotate, are generally oriented vertically and positioned vertically upward from cavities 170-174, during normal operation of gearbox 100. Therefore, it can be difficult to introduce lubricant into the space between the inner surfaces of bushings 122, 124 and the corresponding drive shafts 114, 116. Further, even if lubricant is introduced into those spaces, it can be difficult to adequately maintain lubricant in those spaces, because it tends to migrate vertically downward back into cavities 170-174.

Therefore, in one example, structural housing 134 defines lubricant paths between cavity 172 and the inner surfaces of bushings 122 and 124. The lubricant paths are positioned so that the operation of the gears in cavity 172 moves lubricant from cavity 172 to bushings 122 and 124 through the lubricant paths and back to cavities 170 and 174, respectively.

FIG. 2 shows that, in one example, structural housing 134 defines a set of apertures 180 and 182 that communicate with cavity 172. Structural housing 134 also defines a set of oil reservoirs 184 and 186 that are adjacent to openings 180 and 182. Further, structural housing 134 defines a set of bores 188 and 190 that communicate, at one end, with reservoirs 184 and 186 and that have, on the opposite end, apertures 192 and 194 that communicate with corresponding openings 196 and 198 in bushings 124 and 122. Therefore, as drive shaft 154 drives rotation of bevel gears 158 and 160 within cavity 172, the spurs on the bevel gears splash or otherwise lift lubricant from a lower portion of cavity 172 upwardly toward an upper portion of cavity 172 that contains openings 180 and 182. This action causes at least some of the oil lifted by the teeth of gears 158 and 160 to splash outwardly through apertures 180 and 182 and to fill reservoirs 184 and 186. When reservoirs 184 and 186 are full, oil is continually introduced through openings 180 and 182 by the rotating teeth of gears 158 and 160. This causes oil to migrate outwardly through bores 188 and 190 until it passes through openings 196 and 198 in bushings 122 and 124. This action thus continuously introduces lubricant into the interior of bushings 122 and 124, so that it lubricates the rotational connection between the inner surfaces of bushings 122 and 124, and the corresponding gathering chain drive shafts 114 and 116. It will be noted that openings 196 and 198 can be located between the axial ends of bushings 122 and 124. Thus, lubricant is introduced directly into the bushings.

Figure 3:
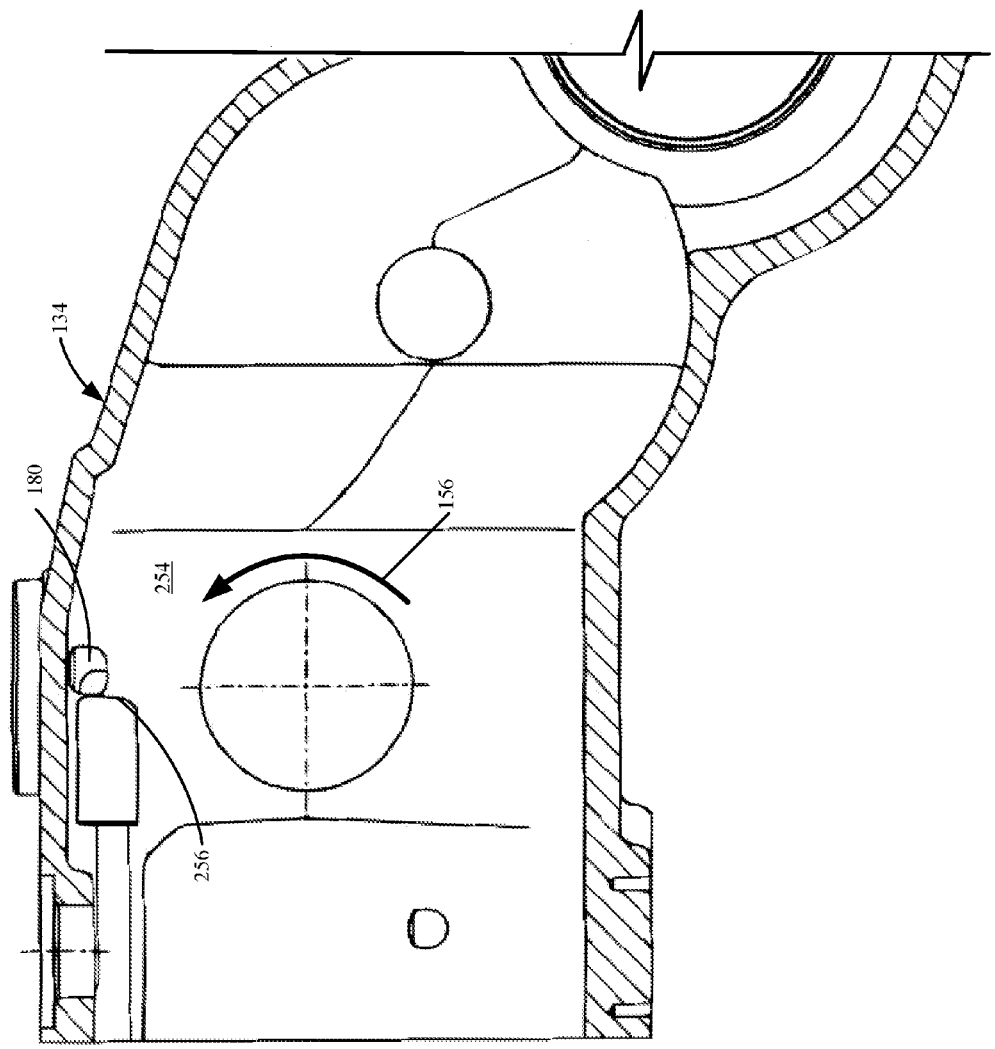
FIG. 3 is a sectional view of a portion of the housing show in FIG. 1 taken a long section lines 3-3.
Figure 3A:
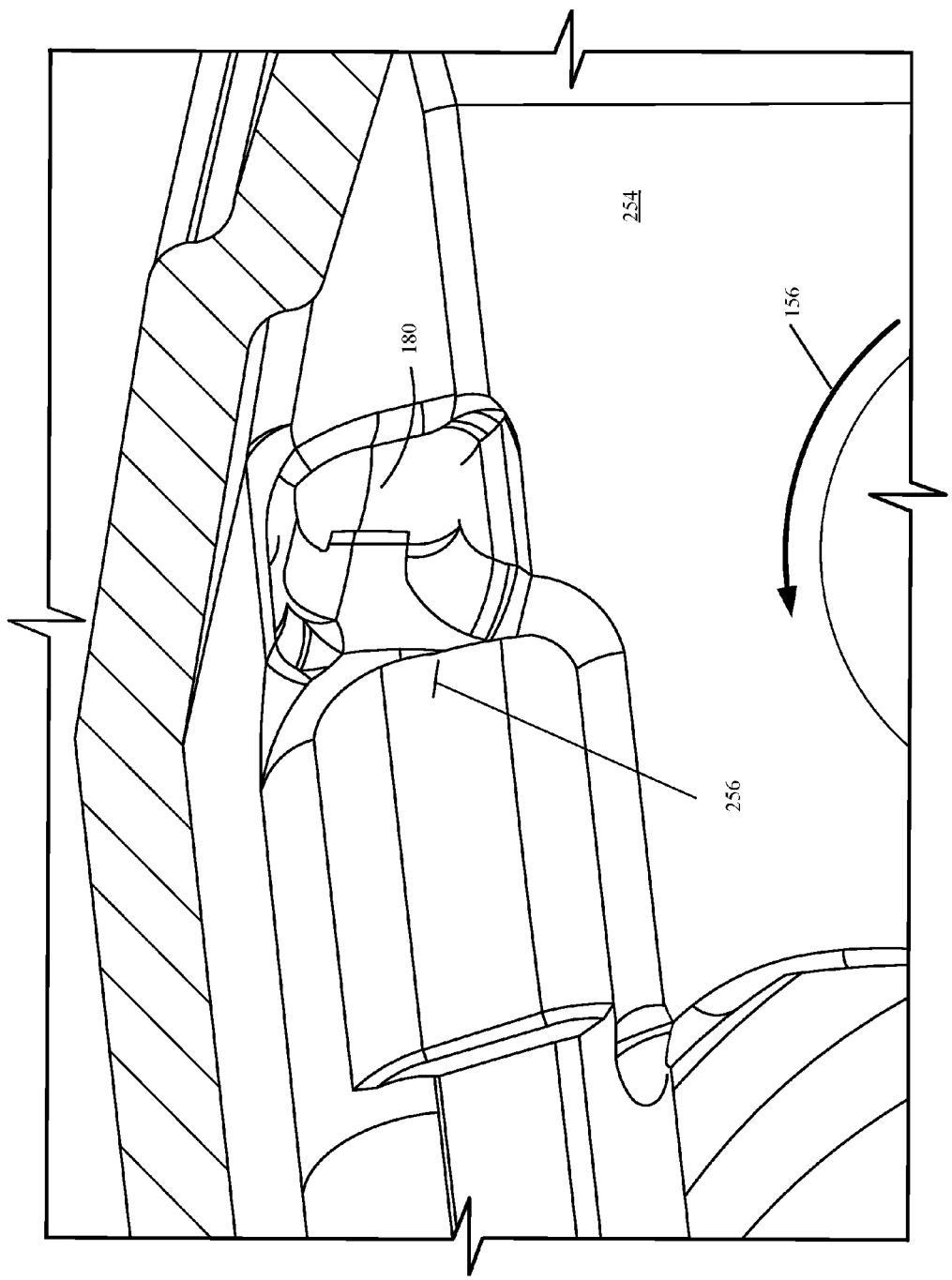
FIG. 3A is an enlarged view of a first portion of the housing illustrated in FIG. 3

FIG. 3 is a cross-section view of a portion of housing 134 taken along section lines 3-3 in FIG. 1. FIG. 3A is an enlarged portion of the housing 134 illustrated in FIG. 3. FIGS. 3 and 3A will now be described in conjunction with one another. The view is taken from within cavity 172, with bevel gears 158 and 160 removed, to show an inner surface of cavity 172 proximate aperture 180 and looking generally in the direction indicated by arrow 252.

It can be seen in FIG. 3 that a portion of cavity 172 is defined by a side wall 254. The side wall defines the aperture 180 that communicates between cavity 172 and reservoir 184. In the example shown in FIG. 3, side wall 254 has an inwardly extending flange (or lubricant deflector) 256 that extends into cavity 172. It extends into cavity 172 so that it is closely proximate the outer edge of the rotating teeth on bevel gear 160. The flange 256 protrudes into cavity 172 so that, as oil (or other lubricant) is carried by the teeth of bevel gear 160 upwardly from the lower portion of cavity 172 to the upper portion of cavity 172, at least some of the oil engages the protruding flange (or lubricant deflector) 256. This deflects the oil, changing its direction of travel (from its initial direction rotating about shaft 154) to a direction that is generally directed through opening 180, and into oil reservoir 184 and eventually outward within bore 188. This enhances the amount of lubricant that is introduced into the bushings from cavity 172. The same arrangement can be provided for deflecting lubricant into bore 190.

Figure 3B:
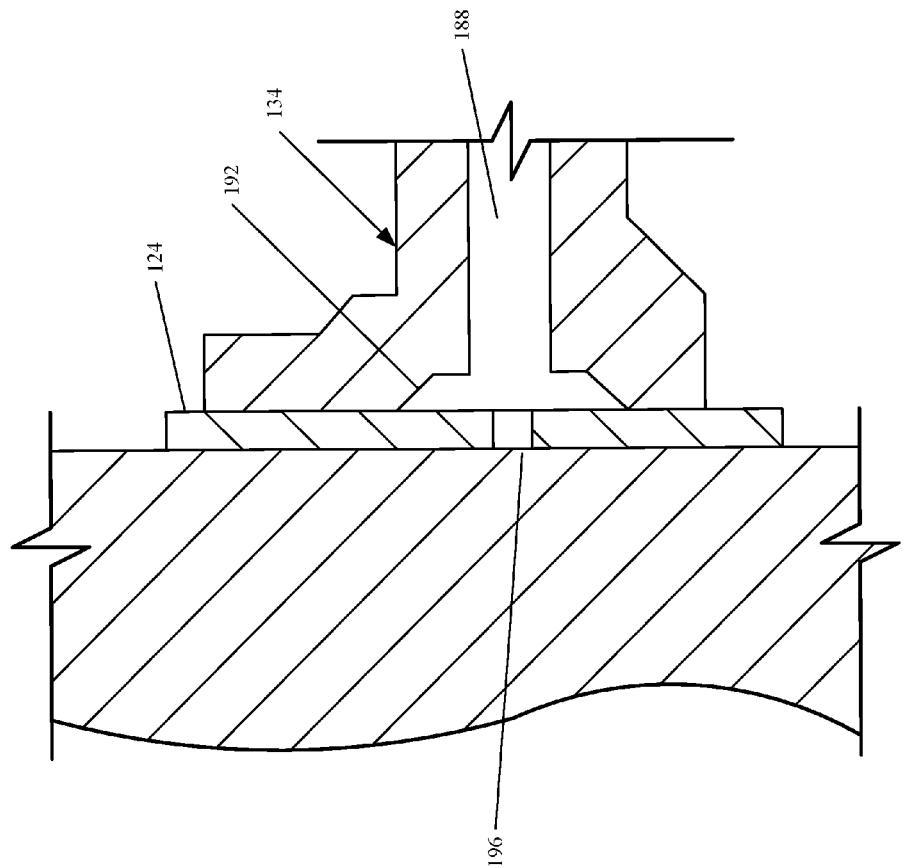
FIG. 3B is an enlarged view of a second portion of the gearbox illustrated in FIG. 2

FIG. 3B shows another example of the configuration of a portion of structural housing 134 to define bore 188. It can be seen that the opening 192 in bore 188, that communicates with opening 196 in bushing 124, is flared. The flared opening 192 has a circumference that is significantly larger than a circumference of opening 196 in bushing 124. Therefore, opening 196 need not be precisely aligned with bore 188 in order to communicate with it. Instead, the opening 196 in bushing 124 need only be positioned generally within the flared opening 192 at the end of bore 188. This makes assembly quicker and more efficient.

In one example, the oil reservoirs 184 and 186 are disposed within structural housing 134 in an orientation such that, when gearbox 100 is in its shipping position, the oil level within gear box 100 substantially fills reservoirs 184 and 186. Then, when gearbox 100 is lowered to its operating position, reservoirs 184 and 186 are already filled. This increases the response of the lubrication system such that, when the bevel gears 158 and 160 begin to turn, they need not displace enough lubricant to fill reservoirs 158 and 160 before lubricant begins to flow through bores 188 and 190. Instead, the displaced oil that is deflected through the openings into reservoirs 184 and 186 will cause the oil therein to, substantially immediately, begin migrating outwardly through shafts 188 and 190, to bushings 122 and 124. The structural housing 134 can also be configured so reservoirs fill when in the storage position as well.

It will also be noted that structural housing 134 and the lubricant paths can be made in a variety of different ways. They can be machined, cast, formed by multiple parts assembled together, or by a single part, etc. Also, portions such as deflector 256 can be cast, machined, or formed of a separate part assembled onto the side wall 254 or otherwise attached. The FIGS. show but one example.

It should also be noted that the different examples described herein can be combined in different ways. That is, parts of one or more examples can be combined with parts of one or more other examples. All of this is contemplated herein.

Example 1 is a harvester row unit gear box, comprising:
a structural housing;
an input shaft, rotatably mounted to the structural housing, and rotatable about a first axis of rotation;
a first bushing mounted to the structural housing and having an inner surface with a first bushing aperture between a first axial end of the first bushing and a second axial end of the first bushing;
a first gathering chain drive shaft rotatably mounted within the first bushing and rotatable about a second axis of rotation generally transverse to the first axis of rotation, to drive a first gathering chain; and
a gear train, mounted within a gear train containment area defined by the structural housing, that links the input shaft to the first gathering chain drive shaft to transfer rotation of the input shaft about the first axis of rotation into rotation of the first gathering chain drive shaft about the second axis of rotation, the structural housing defining a first bore, generally aligned with the first bushing aperture in the first bushing to provide fluid communication between the gear train containment area and the inner surface of the first bushing.

Example 2 is the harvester row unit gear box of any or all previous examples wherein the gear train includes a first gear that rotates within the gear train containment area and wherein the structural housing further comprises:
a structural wall that forms a part of the gear train containment area and that defines a first wall aperture in fluid communication with the first bore.

Example 3 is the harvester row gear box of any or all previous examples wherein the first gear has a set of spurs that rotate within the gear train containment area proximate the first wall aperture in the structural wall.

Example 4 is the harvester row gear box of any or all previous examples wherein the structural wall includes a first lubricant deflector extending into the gear train containment area toward the spurs of the first gear, to deflect lubricant carried by the spurs into the first bore through the first wall aperture.

Example 5 is the harvester row unit gear box of any or all previous examples wherein the first wall aperture has a front side in a direction of rotation of the first gear and a rear side in the direction of rotation of the first gear and wherein the first lubricant deflector is positioned along the rear side of the first wall aperture.

Example 6 is the harvester row unit gear box of any or all previous examples and further comprising:
a first snap roller drive shaft, wherein the first gear drives rotation of the snap roller drive shaft.

Example 7 is the harvester row unit gear box of any or all previous examples wherein the structural housing defines a first lubricant reservoir along a length of the first bore.

Example 8 is the harvester row unit gear box of any or all previous examples wherein the gear box is movable between a shipping or storage position and an operating position, and wherein the first lubricant reservoir is positioned to store lubricant when the gearbox is in the shipping or storage positions.

Example 9 is the harvester row unit gear box of any or all previous examples wherein the first bore has an elongate portion and an end generally aligned with the first bushing aperture, wherein the end of the first bore is enlarged relative to the elongate portion of the first bore.

Example 10 is the harvester row unit gear box of any or all previous examples and further comprising:
a second bushing mounted to the structural housing and having an inner surface with a second bushing aperture between a first axial end of the second bushing and a second axial end of the second bushing; and
a second gathering chain drive shaft rotatably mounted within the second bushing and rotatable about a third axis of rotation generally transverse to the first axis of rotation, to drive a second gathering chain wherein the gear train links the input shaft to the second gathering chain drive shaft to transfer rotation of the input shaft about the first axis of rotation into rotation of the second gathering chain drive shaft about the third axis of rotation, the structural housing defining a second bore, generally aligned with the second bushing aperture in the second bushing to provide fluid communication between the gear train containment area and the inner surface of the second bushing.

Example 11 is the harvester row unit gear box of any or all previous examples wherein the gear train includes a second gear that rotates within the gear train containment area and wherein the structural wall defines a second wall aperture in fluid communication with the second bore, and wherein the gear has a set of teeth that rotate within the gear train containment area proximate the second wall aperture in the structural wall and wherein the structural wall comprises:
a second lubricant deflector extending into the gear train containment area toward the teeth of the second gear, to deflect lubricant carried by the teeth into the second bore through the second wall aperture.

Example 12 is the harvester row unit gear box of any or all previous examples wherein the structural housing defines a second lubricant reservoir along a length of the second bore, wherein the gear box is movable between a shipping or storage position and an operating position, and wherein the second lubricant reservoir is positioned to store lubricant when the gearbox is in the shipping or storage position.

Example 13 is the harvester row unit gear box of any or all previous examples wherein the second bore has an elongate portion and an end generally aligned with the second bushing aperture, wherein the end of the second bore is enlarged relative to the elongate portion of the second bore.

Example 14 is a corn head row unit gear box, comprising:
a structural housing;
an input shaft, rotatably mounted to the structural housing, and rotatable about a first axis of rotation;
a first bushing and a second bushing, each mounted to the structural housing and each having first and second axial ends and an inner surface with a bushing aperture between the first and second axial ends;
a first gathering chain drive shaft rotatably mounted within the first bushing and rotatable about a second axis of rotation generally transverse to the first axis of rotation, to drive a first gathering chain;

a second gathering chain drive shaft rotatably mounted within the second bushing and rotatable about a third axis of rotation generally transverse to the first axis of rotation, to drive a second gathering chain; and a gear train, mounted within a gear train containment area defined by the structural housing, that links the input shaft to the first gathering chain drive shaft and the second gathering chain drive shaft to transfer rotation of the input shaft about the first axis of rotation into rotation of the first gathering chain drive shaft about the second axis of rotation and into rotation of the second gathering chain drive shaft about the third axis of rotation, the structural housing defining a first bore, generally aligned with the first bushing aperture in the first bushing to provide fluid communication between the gear train containment area and the inner surface of the first bushing and a second bore, generally aligned with the second bushing aperture in the second bushing to provide fluid communication between the gear train containment area and the inner surface of the second bushing.

Example 15 is the corn head row unit gear box of any or all previous examples wherein the corn head row unit gear box is movable between a shipping or storage position and an operating position and wherein, when in the operating position, the gear train containment area has an upper portion and a lower portion and wherein the structural housing defines a first opening in the upper portion of the gear box containment area to communicate with the first bore and a second opening in the upper portion of the gear box containment area to communicate with the second bore.

Example 16 is the corn head row unit gear box of any or all previous examples wherein the structural housing defines a first reservoir along a length of the first bore and a second reservoir along a length of the second bore, the first and second reservoirs being positioned to at least partially fill with lubricant when the corn head row unit gear box is in the shipping or storage positions.

Example 17 is the corn head row unit gear box of any or all previous examples wherein the gear train includes a first gear that rotates within the gear train containment area and a second gear that rotates within the gear train containment area and wherein the structural housing further comprises:
  a structural wall that forms a part of the gear train containment area and that defines a first wall aperture in fluid communication with the first bore and a second wall aperture in communication with the second bore, the first gear having a set of teeth that rotate within the gear train containment area proximate the first wall aperture in the structural wall, and the second gear having a set of spurs that rotate within the gear train containment area proximate the second wall aperture in the structural wall.

Example 18 is the corn head row unit gear box of any or all previous examples wherein the structural wall comprises:
  a first lubricant deflector extending into the gear train containment area toward the teeth of the first gear, to deflect lubricant carried by the teeth of the first gear into the first bore through the first wall aperture; and
  a second lubricant deflector extending into the gear train containment area toward the teeth of the second gear, to deflect lubricant carried by the teeth of the second gear into the second bore through the second wall aperture.

Example 19 is a corn head row unit gear box, comprising:
a structural housing;
an input shaft, rotatably mounted to the structural housing, and rotatable about a first axis of rotation;
a first bushing and a second bushing, each mounted to the structural housing and each having first and second axial ends and an inner surface with a bushing aperture between the first and second axial ends;
a first gathering chain drive shaft rotatably mounted within the first bushing and rotatable about a second axis of rotation generally transverse to the first axis of rotation, to drive a first gathering chain;
a second gathering chain drive shaft rotatably mounted within the second bushing and rotatable about a third axis of rotation generally transverse to the first axis of rotation, to drive a second gathering chain;
a first snapper roll drive shaft rotatably mounted to the structural housing about a fourth axis of rotation;
a second snapper roll drive shaft rotatably mounted to the structural housing about a fifth axis of rotation;
a gear train, mounted within a gear train containment area defined by the structural housing, that links the input shaft to the first gathering chain drive shaft, the second gathering chain drive shaft, the first snapper roll drive shaft and the second snapper roll drive shaft, to transfer rotation of the input shaft about the first axis of rotation into rotation of the first gathering chain drive shaft about the second axis of rotation, rotation of the second gathering chain drive shaft about the third axis of rotation, rotation of the first snapper roll drive shaft about the fourth axis of rotation and rotation of the second snapper roll drive shaft about the fifth axis of rotation, the structural housing defining a first bore, generally aligned with the first bushing aperture in the first bushing to provide fluid communication between the gear train containment area and the inner surface of the first bushing and a second bore, generally aligned with the second bushing aperture in the second bushing to provide fluid communication between the gear train containment area and the inner surface of the second bushing.

Example 20 is the corn head row unit gear box of any or all previous examples wherein the gear train includes a first gear that rotates within the gear train containment area and drives rotation of the first snapper roll drive shaft and a second gear that rotates within the gear train containment area and drives rotation of the second snapper roll drive shaft and wherein the structural housing further comprises:
  a structural wall that forms a part of the gear train containment area and that defines a first wall aperture in fluid communication with the first bore and a second wall aperture in communication with the second bore, the first gear having a set of teeth that rotate within the gear train containment area proximate the first wall aperture in the structural wall, and the second gear having a set of teeth that rotate within the gear train containment area proximate the second wall aperture in the structural wall;
  a first lubricant deflector extending into the gear train containment area toward the teeth of the first gear, to deflect lubricant carried by the teeth of the first gear into the first bore through the first wall aperture; and
  a second lubricant deflector extending into the gear train containment area toward the teeth of the second gear, to deflect lubricant carried by the teeth of the second gear into the second bore through the second wall aperture.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A harvester row unit gear box, comprising:
a structural housing;
an input shaft, rotatably mounted to the structural housing, and rotatable about a first axis of rotation;
a first bushing mounted to the structural housing and having an inner surface with a first bushing aperture between a first axial end of the first bushing and a second axial end of the first bushing;
a first gathering chain drive shaft rotatably mounted within the first bushing and rotatable about a second axis of rotation generally transverse to the first axis of rotation, rotation of the first gathering chain drive shaft driving a first gathering chain; and
a gear train, mounted within a gear train containment area defined by the structural housing, that links the input shall to the first gathering chain drive shaft transferring rotation of the input shaft about the first axis of rotation into rotation of the first gathering chain drive shaft about the second axis of rotation, the structural housing defining a first bore, generally aligned with the first bushing aperture in the first bushing providing fluid communication between the gear train containment area and the inner surface of the first bushing; wherein the gear train includes a first gear that rotates within the gear train containment area and wherein the structural housing further comprises a structural wall that forms a part of the gear train containment area and that defines a first wall aperture in fluid communication with the first bore.

2. The harvester row gear box of claim 1 wherein the first gear has a set of gear teeth that rotate within the gear train containment area proximate the first wall aperture in the structural wall.

3. The harvester row gear box of claim 2 wherein the structural wall includes a first lubricant deflector extending into the gear train containment area toward the teeth of the first gear, to deflect lubricant carried by the teeth into the first bore through the first wall aperture.

4. The harvester row unit gear box of claim 3 wherein the first wall aperture has a front side in a direction of rotation of the first gear and a rear side in the direction of rotation of the first gear and wherein the first lubricant deflector is positioned along the rear side of the first wall aperture.

5. The harvester row unit gear box of claim 4 and further comprising:
a first snap roller drive shaft, wherein the first gear drives rotation of the snap roller drive shaft.

6. The harvester row unit gear box of claim 1 wherein the structural housing defines a first lubricant reservoir along a length of the first bore.

7. The harvester row unit gear box of claim 6 wherein the gear box is movable between shipping position or a storage position and an operating position, and wherein the first lubricant reservoir is positioned to store lubricant when the gearbox is in at least one of the shipping or storage positions.

8. The harvester row unit gear box of claim 1 wherein the first bore has an elongate portion and an end generally aligned with the first bushing aperture, wherein the end of the first bore is enlarged relative to the elongate portion of the first bore.

9. The harvester row unit gear box of claim 1 and further comprising:

a second bushing mounted to the structural housing and having an inner surface with a second bushing aperture between a first axial end of the second bushing and a second axial end of the second bushing; and
a second gathering chain drive shaft rotatably mounted within the second bushing and rotatable about a third axis of rotation generally transverse to the first axis of rotation, to drive a second gathering chain wherein the gear train links the input shaft to the second gathering chain drive shaft to transfer rotation of the input shaft about the first axis of rotation into rotation of the second gathering chain drive shaft about the third axis of rotation, the structural housing defining a second bore, generally aligned with the second bushing aperture in the second bushing to provide fluid communication between the gear train containment area and the inner surface of the second bushing.

10. The harvester row unit gear box of claim 9 wherein the gear train includes a second gear that rotates within the gear train containment area and wherein the structural wall defines a second wall aperture in fluid communication with the second bore, and wherein the gear has a set of teeth that rotate within the gear train containment area proximate the second wall aperture in the structural wall and wherein the structural wall comprises:
a second lubricant deflector extending into the gear train containment area toward the teeth of the second gear, to deflect lubricant carried by the teeth into the second bore through the second wall aperture.

11. The harvester row unit gear box of claim 10 wherein the structural housing defines a second lubricant reservoir along a length of the second bore, wherein the gear box is movable between shipping or storage positions and an operating position, and wherein the second lubricant reservoir is positioned to store lubricant when the gearbox is in at least one of the shipping or storage positions.

12. The harvester row unit gear box of claim 11 wherein the second bore has an elongate portion and an end generally aligned with the second bushing aperture, wherein the end of the second bore is enlarged relative to the elongate portion of the second bore.

13. A corn head row unit gear box, comprising:
a structural housing;
an input shaft, rotatably mounted to the structural housing, and rotatable about a first axis of rotation;
a first bushing and a second bushing, each mounted to the structural housing and each having first and second axial ends and an inner surface with a bushing aperture between the first and second axial ends;
a first gathering chain drive shaft rotatable mounted within the first bushing and rotatable about a second axis of rotation generally transverse to the first axis of rotation, rotation of the first gathering chain drive shaft driving a first gathering chain;
a second gathering chain drive shaft rotatably mounted within the second bushing and rotatable about a third axis of rotation generally transverse to the first axis of rotation, rotation of the second gathering chain drive shaft drive a second gathering chain;
a gear train, mounted within a gear train containment area defined by the structural housing, that links the input shaft to the first gathering chain drive shaft and the second gathering chain drive shaft, transferring rotation of the input shaft about the first axis of rotation into rotation of the first gathering chain drive shaft about the second axis of rotation and into rotation of the second gathering chain drive shaft about the third axis of rotation, the structural housing defining a first bore, generally aligned with the first bushing aperture in the first bushing, providing fluid communication between the gear train containment area and the inner surface of the first bushing and a second bore, generally aligned with the second bushing aperture in the second bushing, providing fluid communication between the gear train containment area and the inner surface of the second bushing; and wherein the corn head row unit gear box is movable between shipping or storage positions and an operating position and wherein, when in the operating position, the gear train containment area has an upper portion and a lower portion and wherein the structural housing defines a first opening in the upper portion of the gear box containment area communicating with the first bore and a second opening in the upper portion of the gear box containment area communicating with the second bore.

14. The corn head row unit gear box of claim 13 wherein the structural housing defines a first reservoir along a length of the first bore and a second reservoir along a length of the second bore, the first and second reservoirs being positioned to at least partially fill with lubricant when the corn head row unit gear box is in the storage position.

15. The corn head row unit gear box of claim 14 wherein the gear train includes a first gear that rotates within the gear train containment area and a second gear that rotates within the gear train containment area and wherein the structural housing further comprises:
a structural wall that forms a part of the gear train containment area and that defines a first wall aperture in fluid communication with the first bore and a second wall aperture in communication with the second bore, the first gear having a set of teeth that rotate within the gear train containment area proximate the first wall aperture in the structural wall, and the second gear having a set of teeth that rotate within the gear train containment area proximate the second wall aperture in the structural wall.

16. The corn head row unit gear box of claim 15 wherein the structural wall comprises:
a first lubricant deflector extending into the gear train containment area toward the teeth of the first gear, to deflect lubricant carried by the spurs of the first gear into the first bore through the first wall aperture; and
a second lubricant deflector extending into the gear train containment area toward the teeth of the second gear, to deflect lubricant carried by the teeth of the second gear into the second bore through the second wall aperture.

17. A corn head row unit gear box, comprising:
a structural housing;
an input shaft, rotatably mounted to the structural housing, and rotatable about a first axis of rotation;
a first bushing and a second bushing, each mounted to the structural housing and each having first and second axial ends and an inner surface with a bushing aperture between the first and second axial ends;
a first gathering chain drive shaft rotatably mounted within the first bushing and rotatable about a second axis of rotation generally transverse to the first axis of rotation, rotation of the first gathering chain drive shaft driving a first gathering chain;
a second gathering chain drive shaft rotatably mounted within the second bushing and rotatable about a third axis of rotation generally transverse to the first axis of rotation, rotation of the second gathering chain drive shaft driving a second gathering chain;
a first snapper roll drive shaft rotatably mounted to the structural housing about a fourth axis of rotation;
a second snapper roll drive shall rotatably mounted to the structural housing about a fifth axis of rotation;
a gear train, mounted within a gear train containment area defined by the structural housing, that links the input shaft to the first gathering chain drive shaft, the second gathering chain drive shaft, the first snapper roll drive shaft and the second snapper roll drive shaft, transferring rotation of the input shaft about the first axis of rotation into rotation of the first gathering chain drive shaft about the second axis of rotation, rotation of the second gathering chain drive shaft about the third axis of rotation, rotation of the first snapper roll drive shaft about the fourth axis of rotation and rotation of the second snapper roll drive shaft about the fifth axis of rotation, the structural housing defining a first bore, generally aligned with the first bushing aperture in the first bushing, the first bore providing fluid communication between the gear train containment area and the inner surface of the first bushing and a second bore, generally aligned with the second bushing aperture in the second bushing, the second bore providing fluid communication between the gear train containment area and the inner surface of the second bushing; wherein the gear train includes a first gear that rotates within the gear train containment area and drives rotation of the first snapper roll drive shaft and a second gear that rotates within the gear train containment area and drives rotation of the second snapper roll drive shall and wherein the structural housing further comprises a structural wall that forms a part of the gear train containment area and that defines a first wall aperture in fluid communication with the first bore and a second wall aperture in communication with the second bore, the first gear having a set of teeth that rotate within the gear train containment area proximate the first wall aperture in the structural wall, and the second gear having a set of teeth that rotate within the gear train containment area proximate the second wall aperture in the structural wall;
a first lubricant deflector extending into the gear train containment area toward the teeth of the first gear, deflecting lubricant carried by the spurs of the first gear into the first bore through the first wall aperture; and
a second lubricant deflector extending into the gear train containment area toward the teeth of the second gear, deflecting lubricant carried by the teeth of the second gear into the second bore through the second wall aperture.

* * * * *